US005121457A

United States Patent [19]

Foley et al.

[11] Patent Number: 5,121,457

[45] Date of Patent: Jun. 9, 1992

[54] METHOD FOR COUPLING LASER ARRAY TO OPTICAL FIBER ARRAY

[75] Inventors: Barbara M. Foley, Watertown; Paul Melman, Newton; W. John Carlsen, Boston, all of Mass.

[73] Assignee: GTE Laboratories Incorporated, Waltham, Mass.

[21] Appl. No.: 703,550

[22] Filed: May 21, 1991

[51] Int. Cl.[5] .......... G02B 6/42

[52] U.S. Cl. .......... 385/89; 385/49; 385/52

[58] Field of Search .......... 350/96.10, 96.15, 96.16, 350/96.17, 96.18, 96.20, 96.21, 96.22, 320

[56] References Cited

U.S. PATENT DOCUMENTS

| | | | |
|---|---|---|---|
| 4,130,343 | 12/1978 | Miller et al. | 350/96.15 |
| 4,750,799 | 6/1988 | Kawachi et al. | 350/96.10 X |
| 4,756,590 | 7/1988 | Forrest et al. | 350/96.15 |
| 4,871,224 | 10/1989 | Karstensen et al. | 350/96.15 |
| 5,011,249 | 4/1991 | Diaz | 350/96.15 X |

FOREIGN PATENT DOCUMENTS

| | | | |
|---|---|---|---|
| 2751915 | 7/1978 | Fed. Rep. of Germany | 350/96.15 |
| 52-2442 | 1/1977 | Japan | 350/96.15 |

*Primary Examiner*—John D. Lee

*Attorney, Agent, or Firm*—Victor F. Lohmann, III

[57] ABSTRACT

A method for coupling light from one or more light-emitting devices into corresponding optical fibers includes placing the light-emitting devices on the top surface of a substrate and forming, by photolithographical means, on the top surface of said substrate V-grooves for holding fibers in precise relationship with said light-emitting devices. Additionally, alignment pedestals or posts are formed on said substrate in predetermined relationship to the light emitting devices and alignment V-grooves are photolithographically formed on the top surface of said substrate parallel to said fiber V-grooves. The substrate is cleaved into two sections and said sections are assembled in orthogonal relationship with the section containing the light-emitting devices and alignment posts section being secured to the section containing the fiber and alignment V-grooves so that said posts fit into said alignment V-grooves, thereby aligning the fiber V-grooves with the light-emitting devices.

8 Claims, 6 Drawing Sheets

METHOD FOR COUPLING LASER ARRAY TO OPTICAL FIBER ARRAY

BACKGROUND OF THE INVENTION

This invention relates generally to a method for coupling light from one or more light-generating sources into one or more optical fibers. More specifically, it relates to a method of photolithiographically aligning a laser array to an array of optical fibers (single mode or multimode) which have end faces polished at a 45 degree angle.

Coupling of a semiconductor laser or laser array to an optical fiber or optical fiber array, and, in particular, to single-mode fibers, requires very accurate positioning of the fiber core with respect to the lasing spot of the laser to achieve optimal coupling of the light. The conventional technique typically utilizes a V-groove array which is etched in a substrate such that the V-grooves are photolithographically aligned to the lasers or light sources. The optical fibers are positioned in the V-grooves in a butt-coupling scheme. However, effective coupling of cleaved fibers requires a fiber alignment tolerance, lateral to the beam propagation direction, to within 0.5 $\mu$m with respect to the center of the light beam in order to ensure good coupling efficiency. The coupling efficiency can be further improved by tapering the fiber end or lensing the fiber tip. However, these modifications to the fiber further increase the precision necessary for accurate fiber alignment.

The alignment accuracy in the axial direction (along the direction of beam propagation) is less restrictive than in the lateral direction because the coupling efficiency is less sensitive to the precise distance of the fiber to the laser than to the fiber displacement away from the center of the laser beam. In the conventional laser-to-fiber butt-coupling assembly of FIG. 1*a*, for example, the positioning of the optical fiber in the lateral, y-direction is the least precise but is the most critical since the coupling efficiency is more sensitive to variations in the y and z-directions than in the axial x-direction. For an efficient pigtailing operation, it is desirable to locate the fiber in a fiber receiving conduit, such as a V-groove, to facilitate a permanent fiber attachment in the aligned position. Placing the fiber in such a V-groove, however, allows adjustment of the fiber position in the least critical dimension (x-direction) only, namely along the fiber axis. Additionally, many other parameters of the optical fiber, the laser, and the V-groove substrate affect individual coupling efficiency, or the uniform coupling efficiency of an array.

In co-pending application Ser. No. 07/555,129, filed Jul. 19, 1990 and assigned to the same assignee as the present application, there is shown a method for overcoming some of the disadvantages of the prior art by polishing the ends of the optical fibers at a 45° angle and having the laser beam enter the fiber at a right angle to the fiber axis. While the procedure shown in such application is satisfactory for the purposes therein described, the manual alignment process can be time consuming, particularly if it is desired to couple the light from an array of lasers into corresponding optical fibers.

OBJECTS OF THE INVENTION

It is a principal object of the present invention to obviate the above-noted and other disadvantages of the prior art.

It is a further object of the present invention to use the most precise alignment techniques to devise a method for automatically aligning lasers with corresponding optical fibers.

It is still a further object of the invention to provide laser-to-fiber coupling efficiency equivalent to that obtainable with butt-coupling, but with the advantage of significantly decreased sensitivity to the fiber, V-groove and laser parameters which affect coupling efficiency.

SUMMARY OF THE INVENTION

In a first aspect of the present invention, photolithographic techniques are used on a single substrate to align fiber V-grooves to corresponding lasers in an array, and to position alignment markers and cleave markers on the substrate such that when the substrate is cleaved the resulting two separate sections of the substrate each contain part of the alignment coupling elements. Specifically, a method of coupling the light from one or more light-emitting devices to a corresponding optical fibers comprises the steps of placing one or more light-emitting devices on a substrate in such manner that the light-emitting surfaces are in a straight line and forming at least two alignment posts of a configuration having significant dimensions parallel to said line and two pairs of significant surfaces thereof intersecting at two points in the plane of the substrate which form a line perpendicular to said straight line. Then, in subsequent steps, forming a plurality of V-shaped grooves in said substrate material, said V-shaped grooves being sized to receive optical fibers, two of said V-shaped grooves being spatially separated and positioned such that said two grooves will be axially aligned with said alignment posts, while the other grooves will be axially aligned with said light-emitting surfaces, and forming a cleavage groove laterally across said substrate, at a fixed distance from and parallel to said straight line, and perpendicularly through said plurality of V-shaped grooves. The next steps are fracturing said substrate along said cleavage groove into two sections and securing said two sections of said substrate in orthogonal relationship so that said alignment posts fit into said alignment grooves. One of the two sections includes the laser array, while the other section includes the V-shaped grooves. The coupling method is completed by placing one optical fiber having a 45° end face in each of said said V-shaped fiber grooves aligned with said light-emitting surfaces in such orientation to achieve maximum coupling between said optical fibers and said light-emitting devices.

In a second aspect of the present invention, photolithographic techniques are used on the two separate substrate sections to provide the fiber V-grooves and the alignment markers, but two separate mask sets are required for this aspect thereby increasing the complexity. Specifically, the steps of forming said grooves and said posts on said substrate includes the steps of developing a photomasks having said grooves and posts positioned precisely and photolithographically forming said grooves and posts using said photomask.

DETAILED DESCRIPTION OF THE PREFERRED EMBODIMENT

In the following description, an array will be defined to include the limiting case of of one laser and one fiber. The discussion will be in terms of the coupling between a laser array and a fiber array, and all comments, except those related to uniformity of coupling, will be equally applicable to single laser-to-fiber coupling.

Figure 1A:
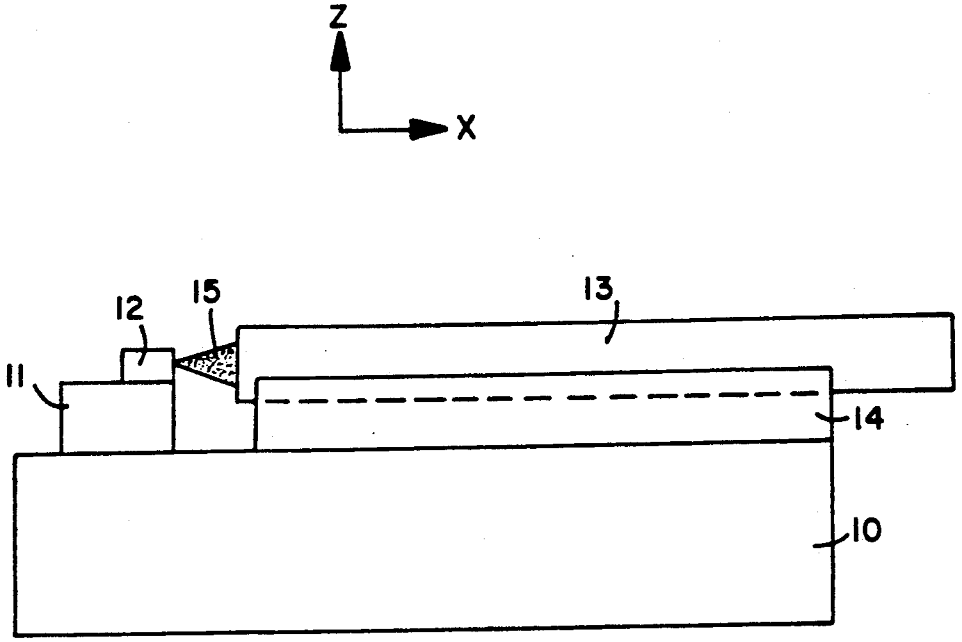
FIG. 1*a* is a lateral view of a conventional laser-to-fiber coupling apparatus.
Figure 1B:
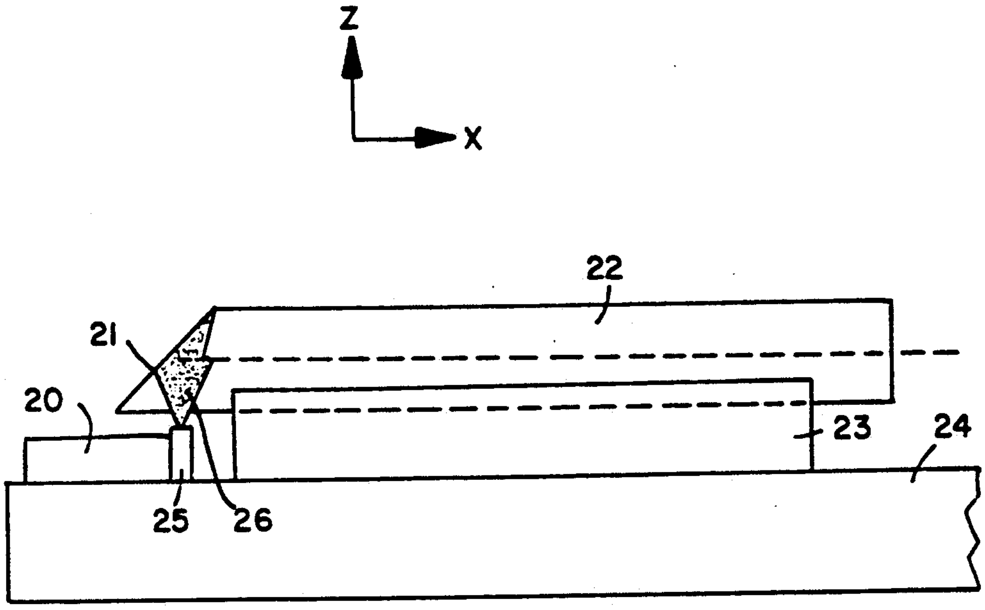
FIG. 1*b* is a lateral view of a laser-to-fiber coupling assembly disclosed in co-pending application, Ser. No. 07/555,129, filed Jul. 19, 1990.

FIG. 1*a* illustrates a conventional coupling apparatus wherein a fiber 13 positioned in a grooved substrate 14 is butt-coupled to a laser chip 12 attached to mount 11. The entire assembly is placed on mounting block 10. An optical wavefront 15 is emitted by laser chip 12 and propagates axially in the x-direction to fiber 13. As noted before, the coupling efficiency from chip 12 to fiber 13 is most affected by misalignments in the least controllable and least precise lateral y- and z directions. p FIG. 1*b* shows a laser-to-beveled fiber coupling geometry in accordance with a first embodiment of the invention described in the aforementioned co-pending application. The coupling apparatus includes a laser mount 20 to which is attached a laser chip 25. Adjacent to this laser assembly is a substrate 23 having a fiber-receiving channel extending axially in the x-direction through the substrate. Preferably, the substrate is etched to form a V-groove geometry. A fiber 22 having a beveled end 21 is slidably positioned in the substrate channel, as indicated by the axially-extended dotted lines, so that the beveled end is above the chip 25. In this configuration, the laser beam propagates through the side of the cylindrical fiber 22 as wavefront 26 and is totally internally reflected by the beveled end 21 into the core of the fiber 22. The cylindrical fiber surface focuses the beam in one plane, resulting in an oval spot on the beveled surface. The maximum percentage of power which can be coupled using this geometry is very close to that which is achievable by the conventional technique shown in FIG. 1*a* illustrating butt-coupling into a cleaved fiber.

In the method of the preferred embodiment of present invention, a substrate 30 of suitable dimensions is selected and one or more light-emitting devices 32 is affixed thereto in any of the methods known in the art. V-grooves 34 to receive optical fibers (not shown) are formed in the substrate, using photolithographical means, such that said V-grooves are in exact axial alignment with the light beam to be emitted from the light-emitting devices 32. Two spatially separated alignment posts 36 and 38 are photolithographically formed in the substrate 30. The alignment posts 36 and 38 must be placed on a line which is parallel to the line of the light-emitting devices 32 and no further removed from the end containing the fiber V-grooves than the light-sources. Likewise, alignment V-grooves 40 and 42 are formed in the substrate 30, parallel to the optical fiber V-grooves 34 and aligned with the alignment posts 36 and 38. Such alignment V-grooves 40 and 42 can be formed photolithographically at the same time as the fiber V-grooves 34 are formed, using a single mask set for the operation. The cross sectional shape of the alignment grooves 40 and 42 should be made to complement the shape of the alignment posts 36 and 38. Thus, if the posts are triangular or diamond shaped, the V-grooves 40, 42 should be of such shape and dimensions to mate therewith. On the other hand, if the posts 36, 38 are cylindrical, the V-grooves 40, 42 should be semicircular of the same diameter as that of the post. Additionally, there is also a smaller cleavage V-groove 44 perpendicular to the fiber and alignment V-grooves 34, 40, 42, which is positioned a distance d, away from the posts 36 and 38, where d is equal to or slightly less than the thickness of the substrate 30. It should also be noted that the fiber and alignment V-grooves must extend beyond the cleavage V-groove 44 so that the fiber and alignment V-grooves will extend completely to the laser portion of the substrate after the cleavage has been completed and the two portions of the substrate have been rearranged in orthogonal relationship.

Figure 2:
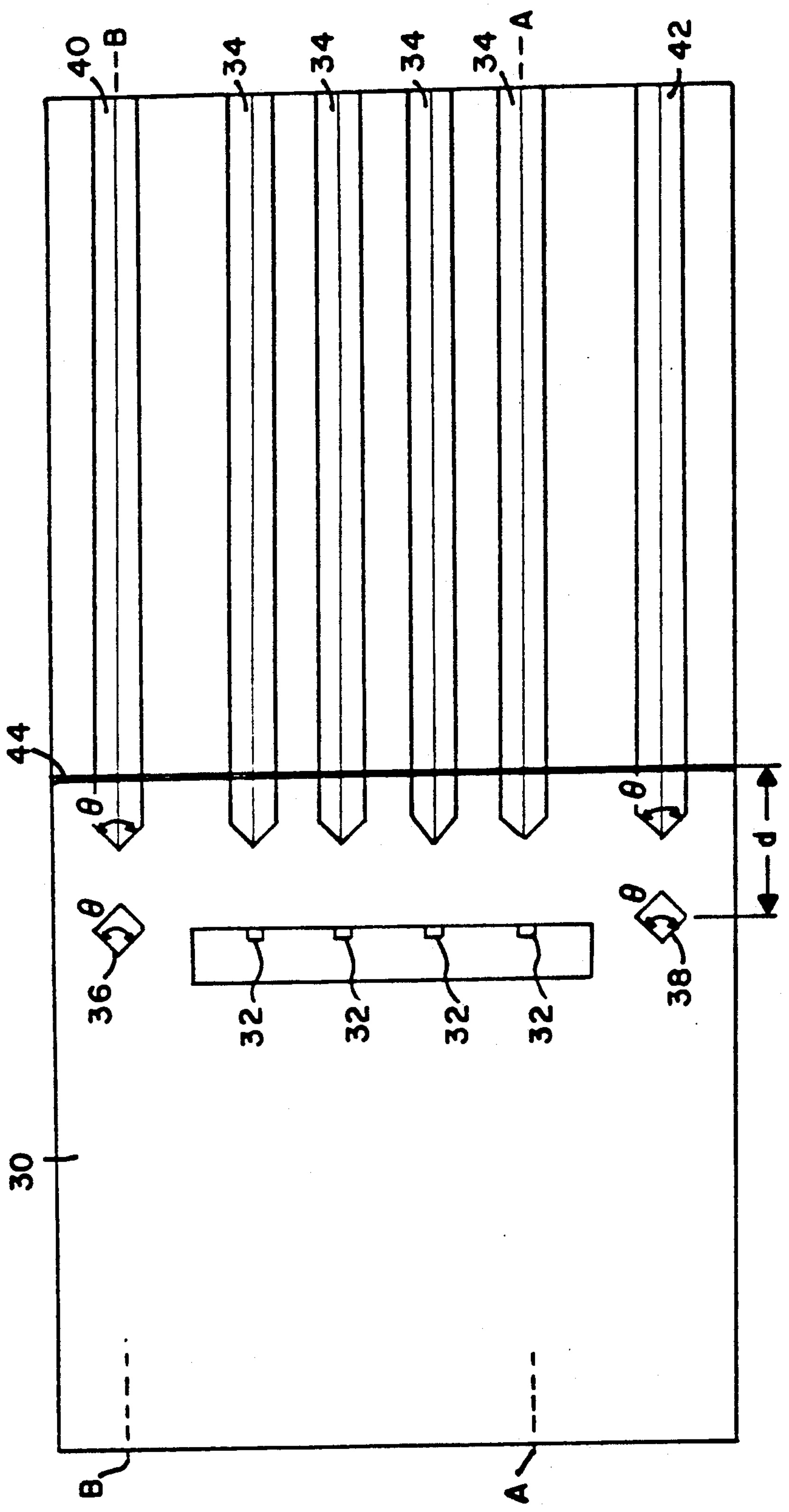
FIG. 2 is a top view of a substrate containing the elements of the present invention.
Figure 3:
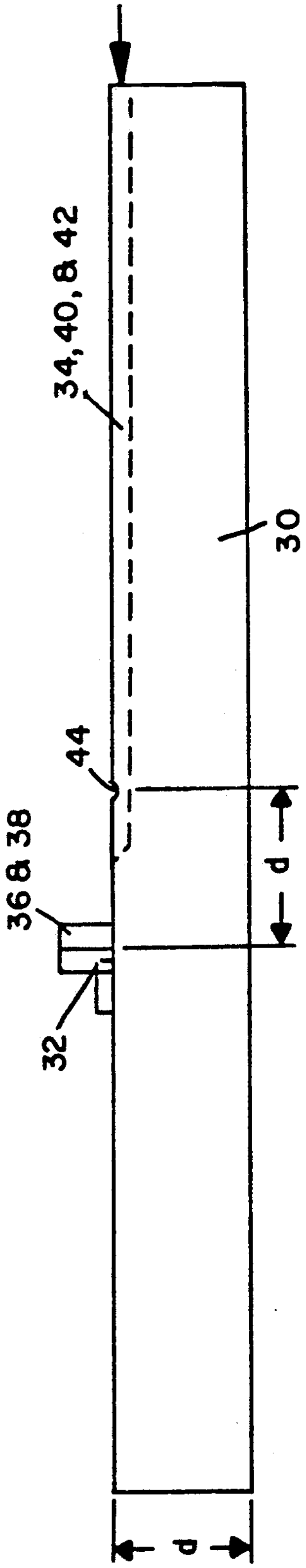
FIG. 3 is a lateral view of the substrate of FIG. 2.

Thus, the preferred embodiment is shown in FIG. 2, in which the alignment posts 36 and 38 are positioned along a line which is almost in line with the faces of the light emitting devices 32 and a distance d from the cleavage V-groove 44. Likewise, the fiber V-grooves 34 and alignment V-grooves 36, 38 are essentially equal in depth and extend beyond the cleavage V-groove 44.

Figure 4:
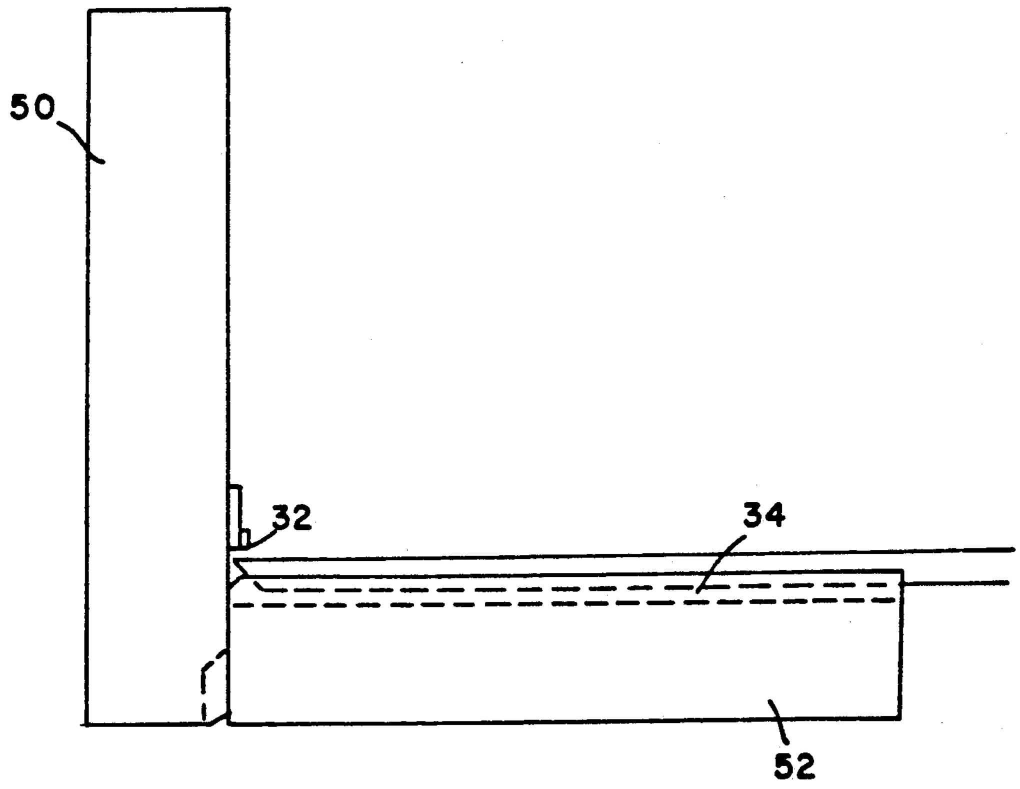
FIGS. 4 and 5 are lateral views along planes A—A and B—B of FIG. 2, respectively, after cleaving and reassembling the substrate.
Figure 5:
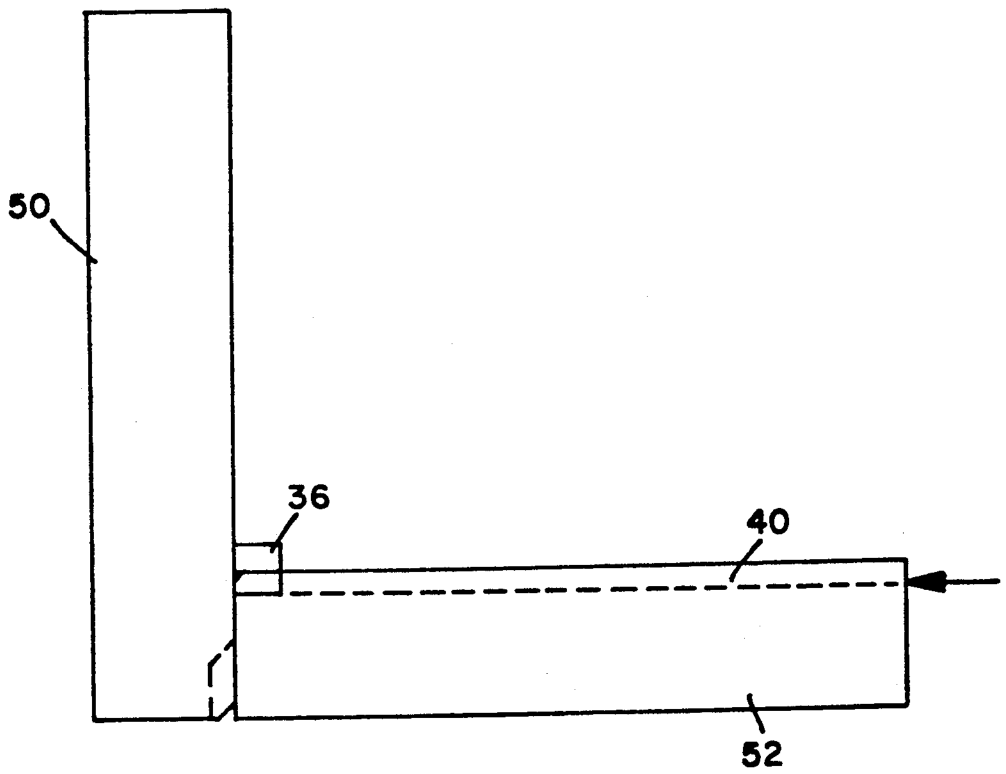

Once the substrate has been prepared as above described, the substrate is cleaved along the V-groove 44 to form a first section 50, shown in FIGS. 4 and 5 containing the light emitting devices 32 and the alignment posts 36 and 38 and a second section 52, also shown in FIGS. 4 and 5, containing the fiber V-grooves 34 and the alignment V-grooves 40 and 42. The two sections are then reassembled in orthogonal relationship as shown in FIGS. 4 and 5, being secured by adhesive or with a right angle mount (not shown).

More specifically, referring to FIG. 4 which shows the two sections 50, 52 of the substrate 30 in cross section along the plane A—A in FIG. 1, after they have been reassembled in orthogonal relationship and an optical fiber, cleaved at a 45° angle is shown in the fiber V-groove 34. FIG. 5 shows the corresponding two sections of the cross section along plane B—B in FIG. 1 after the section have been reassembled in orthogonal relationship and shows how the alignment post 36 fits into the alignment V-groove 40.

Figure 6:
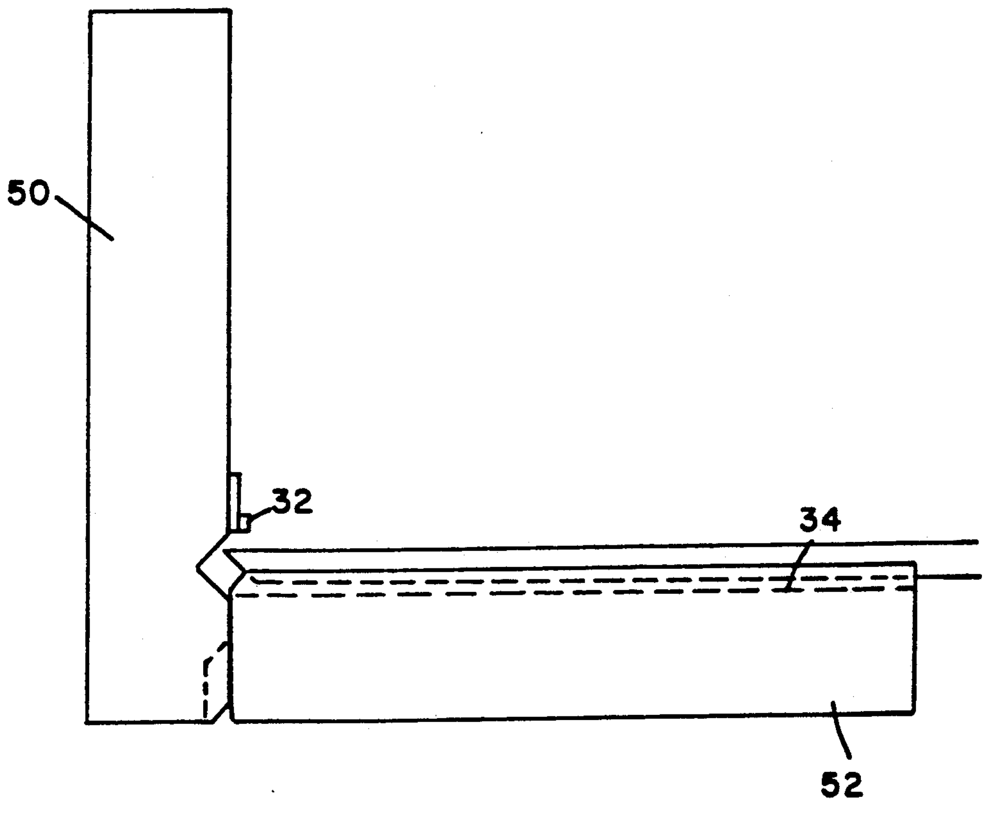
FIG. 6 is a lateral view along plane A—A of an embodiment of the assembly shown in FIG. 2 after cleaving and reassembling the substrate when an additional v-groove is etched in front of and parallel to the laser array.

While FIG. 4 shows the arrangement for p-side up laser orientation, the method of the present invention is equally effective for p-side down orientation if an extra lateral V-groove is formed in front of and directly adjacent the laser array. As shown in FIG. 6, the channel space of the V-groove sufficiently accommodates the tip of the beveled fiber so that the emitted beam is reflected from the beveled end into the fiber.

While the preferred embodiment of the invention has been described above with respect to the use of an initial single substrate, followed by cleaving and reassembling, it is readily apparent to one skilled in the art, that it is possible to start with two individual substrates. Thus, the light emitting devices and alignment posts would be placed on one substrate and the fiber and alignment V-grooves would be formed photolithographically on the other substrate using a photomask prepared by carefully positioning the exact locations of the light emitting devices and alignment posts on the other substrate.

It should be noted that two substrates may be utilized in this method, in which case the steps of forming a cleaving groove and fracturing the initial substrate into two sections could be omitted.

It should also be appreciated by those skilled in the art that other means are available within the scope of the invention for mating two substrates to align the laser to the fiber. On such means utilizes accurately aligned blocks on the two substrates which fit together when the two substrate sections are mated orthogonally. In particular, each of the substrate sections would include a pair of inner alignment block or outer alignment blocks appropriately positioned on the respective substrate surface whereby each inner alignment block is placed in adjacent mating contact with a respective outer alignment block during orthogonal mating to laterally secure the substrate sections. There exists a geometric relationship between the positions of the alignment means and the laser chip such that the light emitted by the lasers optically accesses the corresponding fibers when the substrates are orthogonally mated. This relationship is a function of fiber diameter, V-groove depth, laser thickness, and laser carrier thickness.

What is claimed is:

1. A method of coupling the light from one or more light-emitting devices to corresponding optical fibers comprising:

placing one or more light-emitting devices with respective light-emitting surfaces on a substrate in such manner that the light-emitting surfaces are in a first straight line;

forming at least two alignment posts on said substrate, said posts of a configuration having significant dimensions parallel to said first line and two significant surfaces thereof intersecting at two points in the plane of the substrate which form a second line perpendicular to said first line;

forming a plurality of V-shaped grooves in said substrate, said V-shaped grooves being sized to receive optical fibers;

at least two of said V-shaped grooves being alignment grooves which are spatially separated and positioned such that each of said alignment grooves will be axially aligned with a corresponding one of said alignment posts, while the other grooves will be axially aligned with said light-emitting surfaces;

forming a cleavage groove laterally across said substrate, at a fixed distance from and parallel to said straight line, and perpendicularly through said plurality of V-shaped grooves;

fracturing said substrate along said cleavage groove into two sections;

securing said two sections of said substrate in orthogonal relationship so that said alignment posts fit into said alignment grooves; and placing one optical fiber having a 45° end face in each of said V-shaped fiber grooves aligned with said light-emitting surfaces in such orientation to achieve maximum coupling between said optical fibers and said light-emitting devices.

2. The method according to claim 1 wherein said steps of forming said grooves and said posts comprise the steps of:

developing a photomask having said grooves and posts positioned precisely; and photolithographically forming said grooves and posts using said photomask.

3. The method according to claim 1 in which each light-emitting device is a laser.

4. The method according to claim 1 in which each light-emitting device is a light emitting diode.

5. The method according to claim 1 in which said alignment posts are diamond shaped.

6. The method according to claim 1 in which said at least two alignment posts are triangular.

7. A method of coupling one or more light-emitting devices to corresponding optical fibers comprising the steps of;

positioning a light-emitting device on a substrate is such manner that the light-emitting surfaces of said device are in a straight line;

forming on said substrate at least two alignment posts having significant dimensions parallel to said line, two significant surfaces thereof intersecting at a point perpendicular to said line;

photolithographically forming a plurality of V-shaped grooves in said substrate such that;

a first subset of said plurality of grooves being adapted to receive one optical fiber per groove in axial alignment with the light output of a corresponding light-emitting device; and a second subset of said plurality of grooves, parallel with said fiber receiving grooves, being aligned with the point of each alignment post;

forming a V-groove cleaving line in said substrate perpendicular to said previously formed V-grooves and being located at a distance from said line of light-emitting surfaces equal to or slightly less than the thickness of the substrate;

cleaving said substrate along said cleaving V-shaped groove to form two sections of said substrate;

placing said two sections of said substrate in orthogonal relationship so that said alignment posts fit into said alignment grooves; and placing optical fibers having 45° end faces in said V-shaped fiber grooves in such orientation to achieve maximum coupling between said fibers and the light-emitting devices.

8. A method of coupling light form one or more light emitting devices of a chip having a leading edge to a corresponding optical fiber, wherein each device has a respective light-emitting surface, comprising the steps of:

placing said chip on a substrate;

forming a plurality of fiber-receiving grooves in said substrate;

affixing a pair of inner alignment blocks and a pair of outer alignment blocks to said substrate in a predetermined geometric relationship relative to the lead edge of said chip;

forming a cleavage groove laterally across said substrate, at a fixed distance from and parallel to said leading edge, and perpendicularly through said plurality of fiber-receiving grooves;

fracturing said substrate along said cleavage groove into two sections each having a respective pair of said blocks;

securing said two sections of said substrate in orthogonal relationship so that each inner alignment block is in adjacent mating contact with a respective outer alignment block; and placing one optical fiber having a 45° end face in each of said fiber-receiving grooves aligned with said light-emitting surfaces in such orientation to achieve maximum coupling between said optical fibers and said light-emitting devices.

* * * * *